(12) United States Patent
Macker et al.

(10) Patent No.: US 12,147,476 B2
(45) Date of Patent: Nov. 19, 2024

(54) EMBEDDING AND ANALYZING MULTIVARIATE INFORMATION IN GRAPH STRUCTURES

(71) Applicant: The Government of the United States of America, as represented by the Secretary of the Navy, Arlington, VA (US)

(72) Inventors: Joseph Macker, Washington, DC (US); Michael Iannelli, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/375,504

(22) Filed: Sep. 30, 2023

(65) Prior Publication Data

US 2024/0111807 A1 Apr. 4, 2024

Related U.S. Application Data

(60) Provisional application No. 63/412,281, filed on Sep. 30, 2022.

(51) Int. Cl.
*G06F 16/901* (2019.01)
*G06F 16/906* (2019.01)

(52) U.S. Cl.
CPC ........ *G06F 16/9024* (2019.01); *G06F 16/906* (2019.01)

(58) Field of Classification Search
CPC .......................... G06F 16/9024; G06F 16/906
See application file for complete search history.

(56) References Cited

U.S. PATENT DOCUMENTS

2023/0297720 A1* 9/2023 Harvey ................. G06N 20/00
726/26

* cited by examiner

*Primary Examiner* — Etienne P Leroux
(74) *Attorney, Agent, or Firm* — US Naval Research Laboratory; William P. Ladd

(57) ABSTRACT

Systems and methods are provided for a hypergraph representation and transformation process enabling the cogeneration and analysis of multiple system attributes alongside system node relationships within real world data models. Embodiments of the present disclosure allow for the cogeneration of attribute embeddings, along with node embeddings, within a single, graph-based data set model. Embodiments of the present disclosure provide a higher level of accuracy in problem space representation compared to conventional systems and methods and help to reveal more complex relationships in real world problems.

20 Claims, 5 Drawing Sheets

EMBEDDING AND ANALYZING MULTIVARIATE INFORMATION IN GRAPH STRUCTURES

CROSS REFERENCE TO RELATED APPLICATIONS

This application claims the benefit of U.S. Provisional Patent Application No. 63/412,281, filed on Sep. 30, 2022, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 109686-US2

FIELD OF THE DISCLOSURE

This disclosure relates to data analysis, including data transformation and representation.

BACKGROUND

Statistical relationships within real world data can be done by transforming data sets into graph-based models and then performing analyses on the resultant graph structure via a variety of methods. Graph models can use nodes and vertices (or edges) to represent relationships between real world system components or data and modeling a set of relational information via a graph, enabling a means to study affinity relationships within real world system populations.

Conventional graph modeling (such as cardinality-2 based graph modeling) cannot accurately represent complex component relationships in real world systems (e.g., using a 2-node per vertex model). For example, with cardinality-2 graph models, only pair-wise affinity relationships are well represented, and group or multiple attribute interactions are poorly represented, thus often leading to inaccurate analysis of complex interrelationships. Many real world systems have such complex relational characteristics and will benefit from more accurate modeling processes. Examples of such systems include: complex biological systems, wireless communication networks, and sociological systems.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
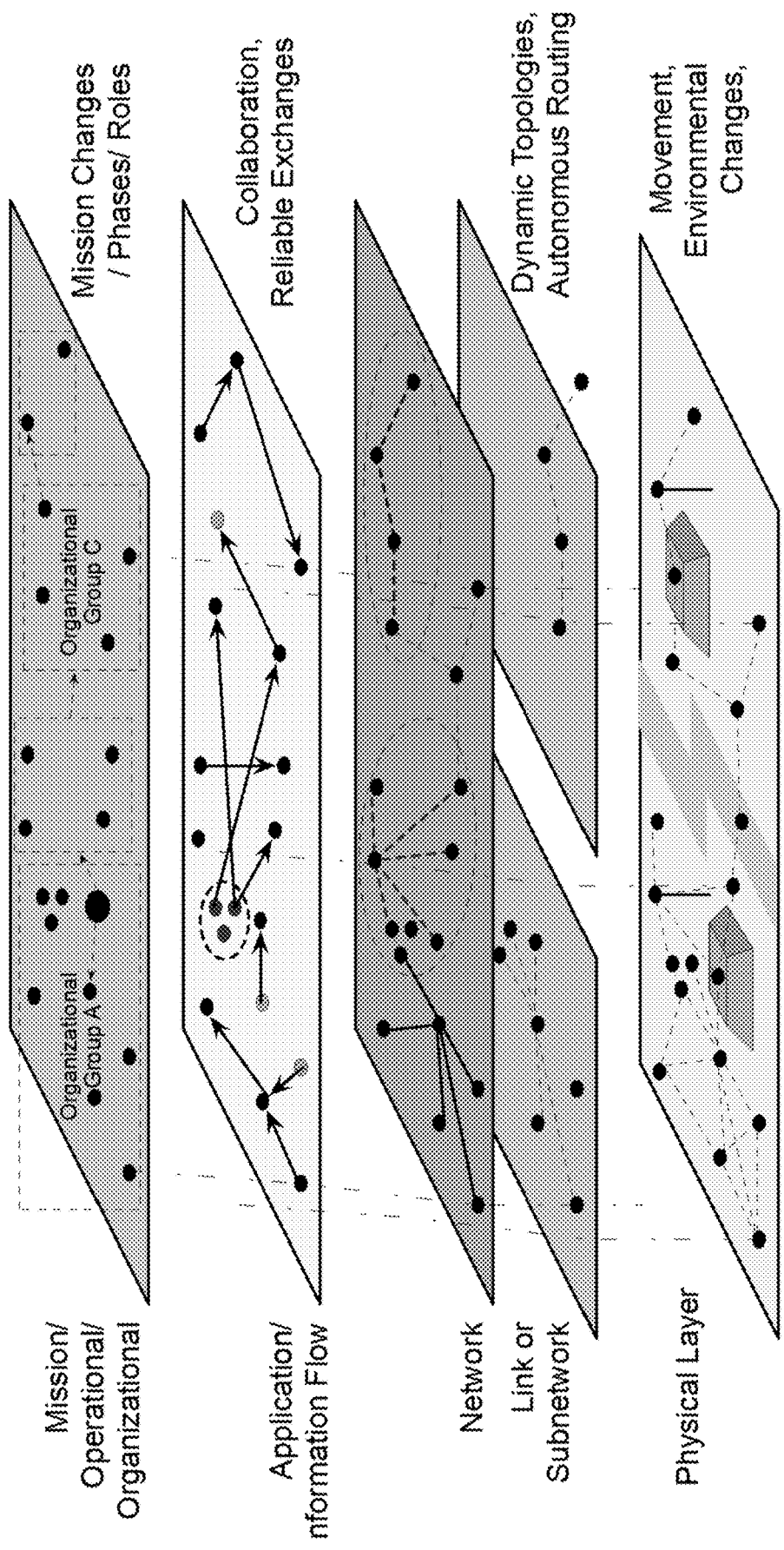
FIG. 1 is a diagram illustrating exemplary cross-layer networked naval wireless communications in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. OVERVIEW

Embodiments of the present disclosure provide systems and methods for a hypergraph representation and transformation process enabling the cogeneration and analysis of multiple system attributes alongside system node relationships within real world data models. Embodiments of the present disclosure allow for the cogeneration of attribute embeddings, along with node embeddings, within a single, graph-based data set model. Embodiments of the present disclosure provide a higher level of accuracy in problem space representation compared to conventional systems and methods and help to reveal more complex relationships in real world problems. Additionally, vectorization of the resulting graph embedding can lead to computationally attractive approaches.

2. HYPERGRAPHS

Multivariate modeling and analysis has important application to many real world problems. The study and measurement of relationships, structures, and patterns in complex systems has many ongoing challenging, but technical solutions are key enablers to modern science pursuits. For example, to better understand, design, and adapt future communication resources, there is a need to address increasingly multi-objective, multivariate optimization problems and apply more accurate processes to analysis chains. General problem space approaches can also benefit advances in product development of other science fields as well, such as biological and genetics research, drug efficacy and tailored medical treatment, complex supply chain and financial forecasting, and critical system resilience and failure analysis (e.g., power grids and sensor grids)

In an embodiment, hypergraphs are a generalization of graph-based mathematical models in which edges (i.e., hyperedges) can join more than two vertices. Thus, hypergraph models can be used to improve the representation of complex relationships between population nodes and other system performance characteristics. An advantage of cardinality-2 graph models is that there exists a large set of available theoretical and statistical results regarding their general properties and a corresponding large of set of practical algorithms available for performing scientific analysis and data exploration.

Representing graph nodes within a vector space (i.e., graph embedding) can simplify the process of learning by using a lower dimensionality representation of a complex data set. Embodiments of the present disclosure provide systems and methods for transforming cardinality-k graph (i.e., hypergraph) models into a unique embedded representation enabling more complex real world systems to be accurately represented. Through this transformation process and related edge labeling, a hypergraph data model in accordance with an embodiment of the present disclosure can enable more complex data analyses to be conducted than those of cardinality-2 methods.

In an embodiment, optimization and resilience is needed across multivariate feature sets of communication systems (e.g., for spectral awareness, cyber awareness, heterogeneous system factors, and weather effects). FIG. 1 is a diagram illustrating exemplary cross-layer networked naval wireless communications in accordance with an embodiment of the present disclosure. As shown in FIG. 1, operational nodes have complex, multivariate communication relationships. In an embodiment, effective hypergraph modeling and analytics of real world problems can be beneficial and can lead to more accurate representations and analysis of complex system and attribute relationships (for example, to improve wireless resource scheduling and topology management for both communications efficiency and robustness and/or to analyze key robustness factors in a resilient, distributed system of systems).

3. EXEMPLARY METHODS

Figure 2:
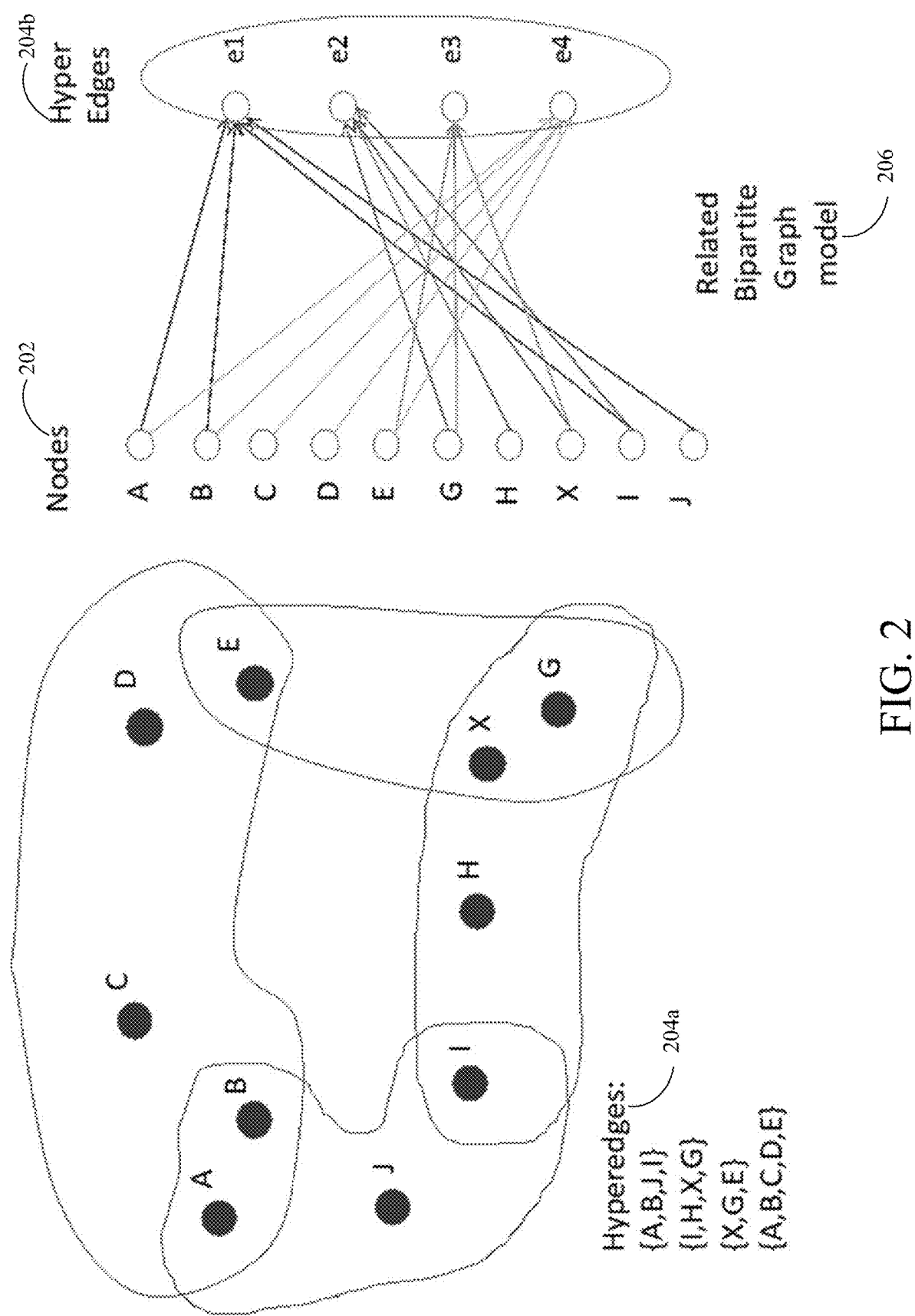
FIG. 2 is a diagram illustrating nodes, hyperedges, and a related biparate graph model in accordance with an embodiment of the present disclosure.

FIG. 2 is a diagram illustrating nodes, hyperedges, and a related biparate graph model in accordance with an embodiment of the present disclosure. In FIG. 2, a collection of nodes 202 form hyperedges 204a in a biparate graph model 206. For example, as shown in FIG. 2, nodes A, B, J, and I form hyperedge {A, B, J, and I}, which is labeled node e1 in the set of nodes 204b formed from hyperedge labels in biparate graph model 206.

Figure 3:
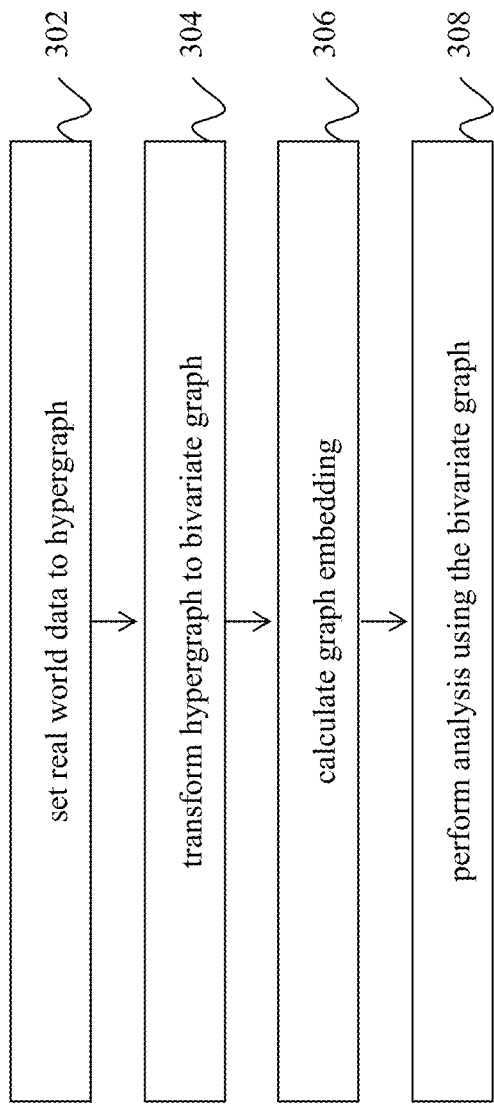
FIG. 3 is a flowchart showing exemplary steps for embedding and analyzing multivariate information in graph structures in accordance with an embodiment of the present disclosure.

FIG. 3 is a flowchart showing exemplary steps for embedding and analyzing multivariate information in graph structures in accordance with an embodiment of the present disclosure. In step 302, real world data is set to a hypergraph. For example, in an embodiment, a hypergraph model of multivatriate nodal relationships is created, and hyperedges are labeled. In an embodiment, step 302 includes building a hypergraph model from a real world multivariate data set and represents complex relationships such as multivariate characteristics of graph nodes as hyperedge relationships (e.g., as illustrated by FIG. 2).

In step 304, the hypergraph is transformed to a bivariate graph. For example, in an embodiment, hyperedge labels are preserved in transformed bivariate graph nodes. In an embodiment, hyperedges are labeled, as illustrated by hyperedge labels 204b for example, so that during the transformation process they become cardinality-2 graph nodes and are more easily tracked and analyzed in later processing.

An example of medical clinical trial data for illustrative purposes will now be discussed with reference to FIGS. 2 and 3. For example, for step 302 (building the initial hypergraph model), some population data is chosen to be represented by hypergraph nodes. For an example of clinical trial data, nodes (e.g., nodes 202) can be chosen to represent patients participating in the clinical trial. In an embodiment, the categorical characteristics of patients can then be represented as hypergraph edges describing multiple variable attributes of each patient (e.g., hyperedges 204a). So, in a basic multivariate data set of a population and related attributes, the nodes can represent the population members, and the hyperedges represent attributes associated with each node. Nodes with common attributes or characteristics can be joined to hyperedges representing those characteristics. In an embodiment, the hyperedge membership can additionally involve the use of weights representing different statistical features of interest, but if weights are absent, the weight values can be set to 1. In an embodiment, this process enables the construction of a weighted or unweighted hypergraph model.

In step 306, graph embedding is calculated. For example, in an embodiment, vectorization embedding for both node and hyperedge data is cogenerated. In an embodiment, in the bipartite transformation process, the left-side nodes 202 include the original nodes from the hypergraph, and the right-side nodes 204b are formed from the set of labeled hyperedges. In an embodiment, all nodes belonging to a common hyperedge (such as nodes A, B, J, and I belonging to hyperedge e1 in FIG. 2) have bipartite edges, potentially weighted, connected to appropriate right-side nodes representing the appropriately labeled hyperedge. In an embodiment, the transformation to a bipartite graph representation enables the direct computation of a large set of existing graph embedding approaches to enable processing such as relevant machine learning and clustering analysis methods. In an embodiment, step 306 involves generating the arrows from nodes 202 to hyperedges 204b in biparate graph model 206.

In an embodiment, the bipartite graph representation is used to build an embedding representation where both the nodes and the hyperedges are represented with appropriate labeling within the cardinality-2 transformed graph embedding. In an embodiment, in this way, the embedding result vectorizes the nodal and hyperedge relationships in one step and includes a representation of relationships within a common structural space. As a concrete example, a random walk vectorization can be applied to construct joint embeddings of both nodes and hyperedges from the graph structure of step 2.

In step 308, analysis is performed using the bivariate graph. For example, in an embodiment, analysis is performed on the cogenerated node and hyperedge embedding. In an embodiment, relational features of nodes and hyperedges are learned (e.g., clustering on multivariate attributes).

In an embodiment, step 308 illustrates how the resulting joint embedding representation can be applied as input to a wide variety of machine learning techniques, such as cluster analysis. In an embodiment, using this approach, the hyperedge and node relationships are represented in a common vectorized space and can be jointly analyzed to enable multivariate analysis, such as determining which variable or sets of variables are more closely associated with a particular community of interest. As illustrative examples, this process has been applied to existing real world system data such as poisonous mushroom and cancer cell clinical trial multivariate data. The multivariate analyses performed using this process demonstrated an ability to jointly learn complex statistical relationships between multiple characteristics. For example, embodiments of the present disclosure can be used to determine which set amongst multiple characteristics are significant indicators of mushrooms being poisonous or which cancer cell indicators were strong predictors of post-surgical remission.

Figure 4:
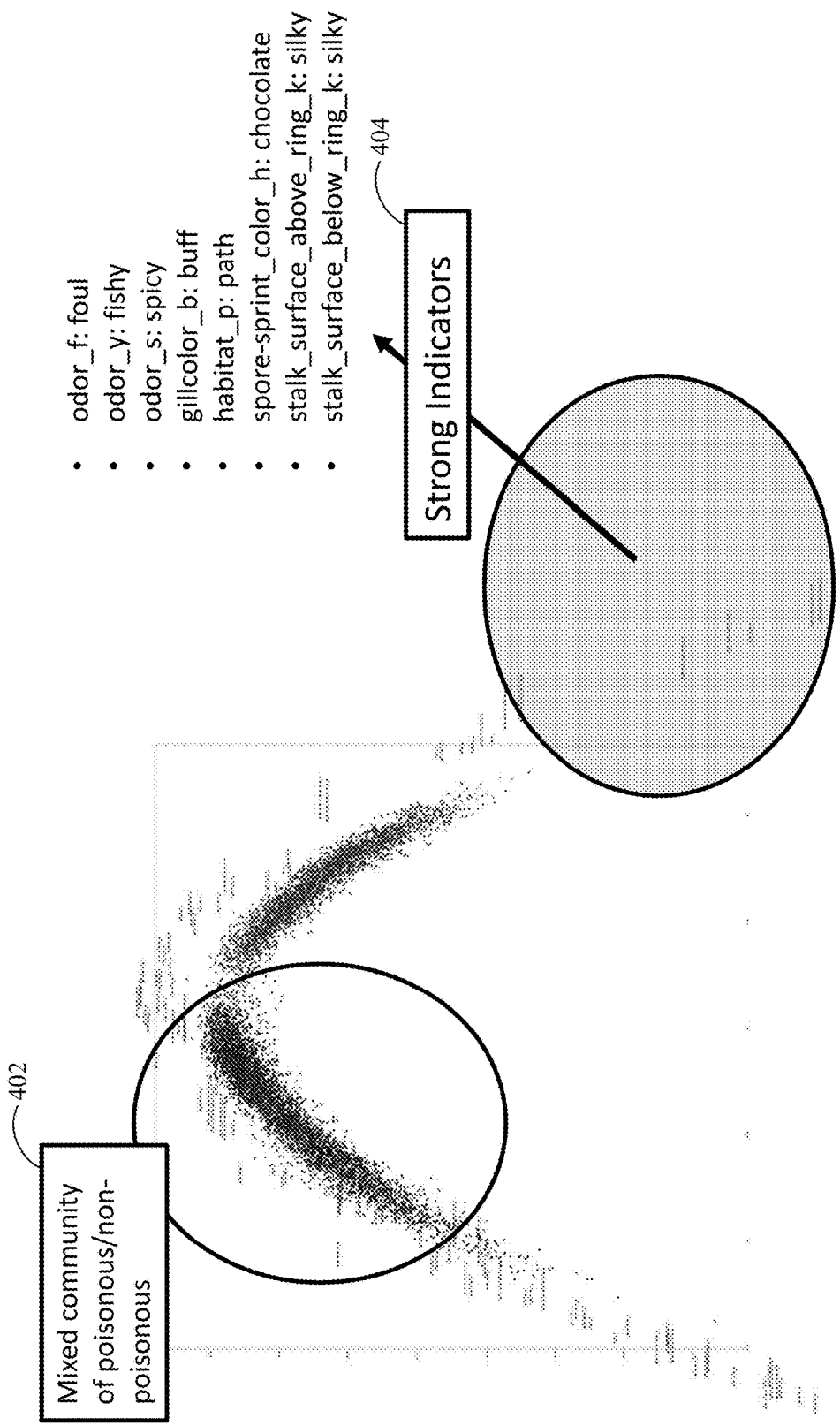
FIG. 4 is a diagram using cluster-based learning on a transformed model of mushroom data in accordance with an embodiment of the present disclosure.

FIG. 4 is a diagram using cluster-based learning on a transformed model of mushroom data in accordance with an embodiment of the present disclosure. An example of categorizing mushroom characteristics will now be discussed with reference to FIG. 4. In this example, over 8000 species of mushrooms are analyzed. In an embodiment, the mushroom data is represented as a hypergraph model, and species of mushroom are set as nodes 202. In an embodiment, hyperedges can be represented as mushroom attribute communities, wherein a single mushroom species corresponds to multiple mushroom attributes (e.g., cap shape, gill color, odor, habitat, poisonous, etc.). The set of multiple mushroom attributes can be mapped to each mushroom species.

In an embodiment, once the bipartite graph model is constructed, analysis can be performed on the cogenerated node and hyperedge embedding using, for example, cluster-based learning on the transformed model, as illustrated by FIG. 4. In FIG. 4, some attributes represent a mixed community of poisonous and non-poisonous mushrooms. Other attributes are strong indicators 404 that a mushroom is poisonous.

In this way, multivariate attributes can be analyzed in higher dimensional space alongside node communities and reveal relational structure. For example, as shown by the example referencing FIG. 4, using cluster-based learning on the transformed model, certain odors can be shown as strong relational attributes in the poisonous class, and other attributes can be shown as less defining. Other examples of complex, real world problems that can be addressed using this method include intelligence analysis, complex system resilience analysis, and networked cyber system analysis.

The method of FIG. 3 can be implemented using hardware, software, or a combination of hardware and software. The method of FIG. 3 can be implemented using a single device (e.g., a general purpose computer) or multiple devices. In an embodiment, the method of FIG. 3 can be implemented using a special purpose device for graphical analysis (e.g., in an embodiment, a standalone special purpose device). In an embodiment, a device performing the method of FIG. 3 can use an existing data set (e.g., via download) or the device can also be used to gather data and analyze it.

4. EXEMPLARY MULTIVARIATE INFORMATION ANALYZER

Figure 5:
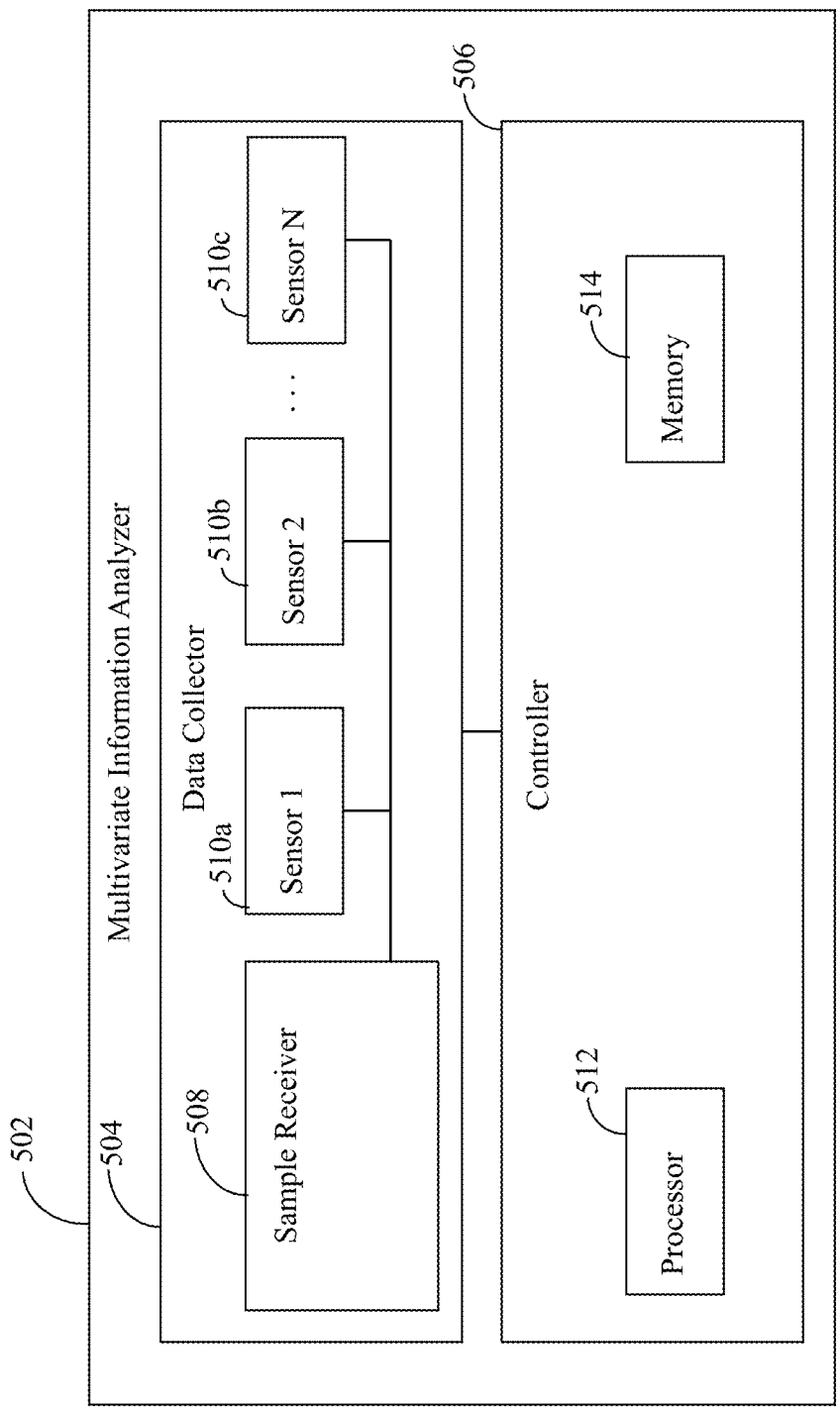
FIG. 5 is a diagram of an exemplary multivariate information analyzer in accordance with an embodiment of the present disclosure.

FIG. 5 is a diagram of an exemplary multivariate information analyzer in accordance with an embodiment of the present disclosure. In FIG. 5, multivariate information analyzer 502 includes a data collector 504 and a controller 506, which optionally includes a processor 512 and a memory 514. In FIG. 5, sample analyzer 504 optionally includes a sample receiver 508 configured to receive a sample (or, in an embodiment, sample information) coupled to one or more optional sensors 510 that are configured to sense information from the sample.

For example, in a mushroom analysis example, one or more mushrooms can be put into sample receiver 508, and sensors 510 can gather information about the mushrooms. This information can be stored in memory (e.g., in memory 514 or another memory accessible by sample analyzer 504). In an embodiment, controller 506 oversees gathered information from sensors 510 and instructs this information to be stored in memory. For example, in an embodiment, sensors 510 can include a 3d scanner, an odor analyzer, a camera, etc. Additionally or alternatively, information regarding sample(s) can be input into sample analyzer 504 (e.g., manually or via data transfer).

In an embodiment, controller 506 can perform the method of FIG. 3 using the information in data collector 504. For example, in step 302, controller 506 can set the mushroom data to a hypergraph. In an embodiment, controller 506 can assign respective nodes to a plurality of samples in the gathered information (e.g., mushroom species). In an embodiment, controller 506 can assign respective characteristics in the gathered information from each sample in the plurality of samples to each node in the respective nodes.

For example, in step 304, controller 506 can transform the hypergraph to a bivariate graph (e.g., by labeling groupings of mushroom characteristics as hyperedges). In an embodiment, controller 506 can assign hyperedges to a plurality of sensed characteristics from the samples representing attribute communities, wherein a single mushroom species corresponds to multiple mushroom attributes (e.g., cap shape, gill color, odor, habitat, poisonous, etc.).

For example, in step 306, controller 506 can calculate graph embedding (e.g., by associating nodes representing mushroom species with the labeled hyperedges). For example, in step 308, controller 506 can perform analysis on cogenerated node and hyperedge embedding (e.g., by performing cluster-based learning on a transformed model of mushroom data, as illustrated by FIG. 4). In an embodiment, controller 506 can determine, based on the results of the cluster-based learning, a plurality of outlier characteristics in the gathered information. For example, as illustrated by FIG. 4, some attributes represent a mixed community of poisonous and non-poisonous mushrooms, and other (e.g., outlier) attributes are strong indicators 404 that a mushroom is poisonous.

Controller 506 can be implemented using hardware, software, or a combination of hardware and software in accordance with embodiments of the present disclosure. Controller 506 can be implemented using a single device or multiple devices in accordance with embodiments of the present disclosure. Controller 506 can be implemented as a standalone device or as part of a host device (e.g., as part of multivariate information analyzer 502 or as part of a general purpose computer). In an embodiment, controller 506 is a special purpose device. In an embodiment, controller 506 can be implemented using a general purpose computer.

5. EXEMPLARY ADVANTAGES

Embodiments of the present disclosure enable the cogeneration of attribute embeddings along with node embeddings to provide more accurate representation and analysis of complex relationships. This provides a more accurate representation of multivariate data systems, ultimately resulting in an embedded graph model transformation allowing a large variety of existing analytic techniques to be applied to a set of complex real world problems. As compared to conventional approaches, vectorization of the resulting graph embedding can lead to computationally attractive approaches.

In an embodiment, a hypergraph model can be used in a variety of ways to represent complex data and variables associated with a problem. Temporal representations of a hypergraph model may also be represented and similarly embedded with temporal vector representations. In this way, methods in accordance with embodiments of the present disclosure can be used to learn temporal multivariate relationships. In this variation, the bipartite model edges can be updated in time to represent dynamics, and the embedding process can use temporal sliding windows of data to capture evolving representations of relationships.

6. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A multivariate information analyzer, comprising:
   a data collector, comprising:
      a sample receiver configured to receive a plurality of samples, and
      a plurality of sensors coupled to the sample receiver, wherein the plurality of sensors are configured to sense information from respective samples in the plurality of samples, thereby generating gathered information; and
   a controller coupled to the data collector, wherein the controller is configured to:
      set the gathered information to a hypergraph,
      transform the hypergraph into a bivariate graph,
      calculate graph embedding in the bivariate graph, and
      perform analysis using the bivariate graph.

2. The multivariate information analyzer of claim 1, wherein the controller is further configured to:
   assign respective nodes to respective samples in the plurality of samples;
   assign respective characteristics in the gathered information from each sample in the plurality of samples to each node in the respective nodes; and
   set the gathered information to the hypergraph based on the assigned respective nodes and the assigned respective characteristics.

3. The multivariate information analyzer of claim 2, wherein the controller is further configured to:
   assign respective hyperedges to respective groupings of the respective characteristics; and
   transform the hypergraph into a bivariate graph based on the assigned respective hyperedges.

4. The multivariate information analyzer of claim 3, wherein the controller is further configured to assign the respective hyperedges to the respective groupings of the respective characteristics based on a determination that respective characteristics in a hyperedge correspond to an attribute community.

5. The multivariate information analyzer of claim 4, wherein the controller is further configured to:
   associate respective nodes with respective hyperedges; and calculate the graph embedding in the bivariate graph based on the association of the respective nodes with the respective hyperedges.

6. The multivariate information analyzer of claim 5, wherein the controller is further configured to:
perform cluster-based learning on the bivariate graph; and
perform the analysis using results of the cluster-based learning.

7. The multivariate information analyzer of claim 6, wherein the controller is further configured to:
determine, based on the results of the cluster-based learning, a plurality of outlier characteristics in the gathered information.

8. A multivariate information analyzer, comprising:
a data collector, comprising a sample receiver configured to receive gathered information regarding a plurality of samples; and
a controller coupled to the data collector, wherein the controller is configured to:
set the gathered information to a hypergraph,
transform the hypergraph into a bivariate graph,
calculate graph embedding in the bivariate graph, and
perform analysis using the bivariate graph.

9. The multivariate information analyzer of claim 8, wherein the controller is further configured to:
assign respective nodes to respective samples in the plurality of samples;
assign respective characteristics in the gathered information from each sample in the plurality of samples to each node in the respective nodes; and
set the gathered information to the hypergraph based on the assigned respective nodes and the assigned respective characteristics.

10. The multivariate information analyzer of claim 9, wherein the controller is further configured to:
assign respective hyperedges to respective groupings of the respective characteristics; and
transform the hypergraph into a bivariate graph based on the assigned respective hyperedges.

11. The multivariate information analyzer of claim 10, wherein the controller is further configured to assign the respective hyperedges to the respective groupings of the respective characteristics based on a determination that respective characteristics in a hyperedge correspond to an attribute community.

12. The multivariate information analyzer of claim 11, wherein the controller is further configured to:
associate respective nodes with respective hyperedges; and
calculate the graph embedding in the bivariate graph based on the association of the respective nodes with the respective hyperedges.

13. The multivariate information analyzer of claim 12, wherein the controller is further configured to:
perform cluster-based learning on the bivariate graph; and
perform the analysis using results of the cluster-based learning.

14. The multivariate information analyzer of claim 13, wherein the controller is further configured to:
determine, based on the results of the cluster-based learning, a plurality of outlier characteristics in the gathered information.

15. A method, comprising:
receiving, using a controller device, gathered information from a plurality of samples;
setting, using the controller device, the gathered information to a hypergraph;
transforming, using the controller device, the hypergraph into a bivariate graph;
calculating, using the controller device, graph embedding in the bivariate graph; and
performing, using the controller device, analysis using the bivariate graph.

16. The method of claim 15, further comprising:
receiving the plurality of samples at a sample receiver; and
sensing, using a plurality of sensor devices, information from the respective samples in the plurality of samples, thereby generating the gathered information.

17. The method of claim 15, further comprising:
assigning respective nodes to respective samples in the plurality of samples;
assigning respective characteristics in the gathered information from each sample in the plurality of samples to each node in the respective nodes; and
setting the gathered information to the hypergraph based on the assigned respective nodes and the assigned respective characteristics.

18. The method of claim 17, further comprising:
assigning respective hyperedges to respective groupings of the respective characteristics; and
transforming the hypergraph into a bivariate graph based on the assigned respective hyperedges.

19. The method of claim 18, further comprising:
associating respective nodes with respective hyperedges; and
calculating the graph embedding in the bivariate graph based on the association of the respective nodes with the respective hyperedges.

20. The method of claim 15, further comprising:
performing cluster-based learning on the bivariate graph;
performing the analysis using results of the cluster-based learning; and
determining, based on the results of the cluster-based learning, a plurality of outlier characteristics in the gathered information.

* * * * *